May 15, 1951          O. N. DAVIS          2,553,443
WING-MOUNTED JET PROPULSION SYSTEM FOR AIRCRAFT
Filed June 16, 1947
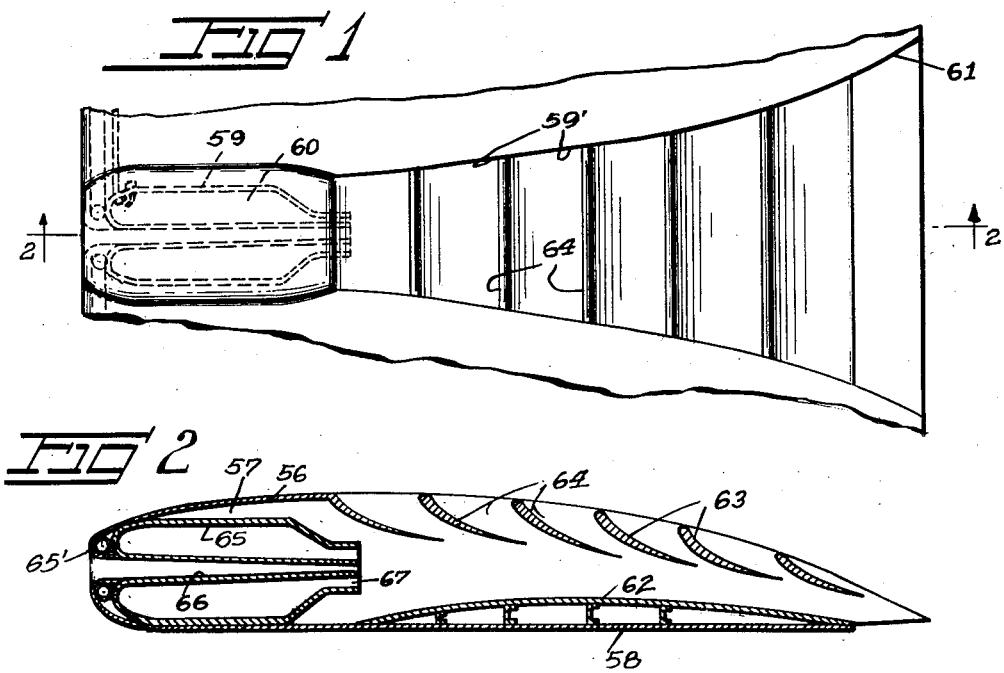
INVENTOR.
Oscar N. Davis
BY
Wilfred E. Lawson
ATTORNEY Patented May 15, 1951

2,553,443

UNITED STATES PATENT OFFICE 2,553,443

WING-MOUNTED JET PROPULSION SYSTEM FOR AIRCRAFT

Oscar N. Davis, Wichita, Kans.

Application June 16, 1947, Serial No. 754,951

2 Claims. (Cl. 244—15)

1

This invention relates generally to the class of power plants and is directed particularly to improvements in jet engines and to the application of the same to aircraft.

Another object of the invention is to provide a novel combination airfoil structure for an airplane and a jet type engine whereby there is obtained a preaction jet in coaction or combination with a ram jet whereby to obtain a greater lift action with less forward travel or movement of the aircraft.

A further object of the invention is to provide a jet motor construction wherein a means is provided whereby the reduced pressure area normally occurring around the jet and jet nozzle and rearwardly thereof is made to develop in an area forwardly of the jet engine so that a reduced pressure is developed in advance of the air foil with which the motor is associated so as to effect a forward pull upon the airfoil in conjunction with the rearward thrust imparted thereto by means of the jet.

A still further object of the invention is to provide an improved jet type engine in which a combustion chamber or chambers are grouped around a central draft tube through which air is drawn for admixture with the jet flame at the jet nozzle end to effect the addition to the streamline of the discharging jet and cause a low pressure area in advance of the engine.

Other objects and advantages of the invention will become apparent as the description of the same proceeds and the invention will be best understood from a consideration of the following detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Figure 1 is a view in top plan of a portion of an airplane wing showing the method of mounting the jet motor therein.

Figure 2 is a sectional view taken substantially on the line 2—2 of Figure 1.

Referring now more particularly to the drawing, a portion only of one airplane wing is illustrated for the purpose of showing how the combination of the reaction or jet engine and wing structure may be set up.

In accordance with the present invention two definite forces are developed which coact to produce forward movement of the structure in which the jet engine is installed. One of such forces is the usual ram jet effect and the other force results from the reduction of pressure at the forward or advancing edge of the airplane wing. This produces what I term a pre-action jet which is the force of a partial vacuum caused by the jet, and occurring at the leading edge of the wing. Thus the combination of the jet in a tunnel is employed to create a low pressure area in the front of the plane wing and accordingly there is produced a much greater thrust at low velocities than is possible with the present day reaction jet. Another novel feature of the pre-action jet is the fact that it may be located at any effective position on the airplane. It may be used as a wing jet or a number of such engines may be grouped around a turbine and all enclosed in a suitable cowling or tunnel to thus cause a low pressure area in front of the aircraft in addition to the reaction or ram jet action in the rear.

In addition to the foregoing the arrangement of the jet engine in the tunnel or cowling whereby air is drawn from the leading edge past the fins or blades in the rear part of the tunnel, prevents the development of eddy currents and causes a steady stream to join the jet stream issuing from the jet nozzle and such highly heated fluids produce an effective forward thrust against the wing structure which is, as previously described, assisted or augmented by the reduced pressure at the forward or leading edge of the wing. This action makes possible the taking off and landing of the airplane at lower travel speeds.

By angling the jet downwardly at the rear of the wing a lifting effect is produced which facilitates the taking off of the plane at a greatly reduced speed. These jets may be placed in any number at any desired point along the wing structure.

It will be understood, of course, that the interior of the air tunnel or cowl will be suitably protected against the effects of the high temperature, by any suitable means.

The airplane wing structure is indicated as a whole by the numeral 56, the convex top of the wing being designated 57 while the underside is designated 58. Formed through the wing from the leading to the trailing edges is an air tunnel designated 59 and, as shown, such tunnel is of substantially constant diameter at its forward end through an extent substantially equal to the length of the jet engine structure which is generally designated 60, after which the tunnel is flattened out in a horizontal plane or gradually increases in width as indicated at 59'. Thus the opening or outlet of the tunnel at the trailing edge of the wing, is relatively flat but of substantial width as indicated at 61.

The bottom of the flattened and fan-like portion of the tunnel which is defined by the curved side wall 59', has a suitable floor structure 62 extending from the rear part of the jet engine to the opening 61 as shown. This floor structure is, of course, made of material suitably resistant to the heat of the jet from the engine 60.

The top of the rear portion of the tunnel has the downwardly and rearwardly curving fins or vanes 63 at spaced intervals throughout the length of such rear portion and between the vanes the top of the wing structure is open providing the air inlet openings 64. As shown the inner ends of the fins are substantially straightened out and are disposed substantially in a common plane lying above the path of the jet from the engine 60.

The engine 60 is formed to provide a central draft tube extending longitudinally therethrough. This engine 60 comprises the outer wall or shell 65 and the central axial cold air tube 66, such wall and tube being joined at their forward ends while at their other ends they are in spaced concentric relation to form the annular outlet opening 67. An air pressure supply pipe 65' extends across the forward end of the engine and supplies air to the combustion chamber from a suitable source of supply (not shown).

The general contour of the entire unit will conform to the contour of the wing with the exception of a slight enlargement at the upper leading edge as shown, where the engine unit 60 is located. As will be apparent, as air is added to the jet stream such stream flattens out in a horizontal plane as it approaches the rear edge of the wing. The air is drawn in across the upper surface through the openings 64 and flows downwardly and rearwardly between the fins or vanes. This air in being added to the streamline cools and reduces the velocity from the jet and at the same time greatly increases the total thrust.

In the present invention the jet engine mounted in the specific manner defined and functioning in cooperation with the air flow controlling vanes or fins, not only employs the usual reaction or ram jet action for moving the supporting structure forwardly but, because of the novel arrangement, produces a pre-action effect by reducing the air pressure at the leading edge of the wing structure instead of rearwardly of the engine jet nozzle as is the case in the use of jet engines in open or unconfined spaces. The reduction of the pressure at the forward or leading edge of plane wing tends to draw or pull the wing forwardly and the ram or thrust action of the jet escaping from the trailing edge of the wing has the effect of pushing the wing structure so that the combined actions result in greater thrust movement against the entire wing thereby making possible the operation of the plane at a lower flying speed.

I claim:

1. The combination with an airplane wing having an air tunnel extending transversely through the wing and opening at its forward and rear ends through the forward and trailing edges respectively of the wing, of a jet engine supported in the forward end of the tunnel and having a rearwardly directed jet nozzle, and an air tube extending longitudinally through said engine and having its forward end flared to facilitate the intake of air and its rear end disposed concentrically of the discharge end of said nozzle so that the air flow therethrough will accelerate the discharge of the combustion gases from the nozzle, said wing being formed with air inlet slots in its top surface and a plurality of spaced fins curving downwardly and rearwardly at the top side of said tunnel and extending crosswise thereof, said fins forming passageways connecting said slots and said tunnel.

2. The invention as defined in claim 1, wherein the said tunnel is of gradually increasing width rearwardly from the vicinity of the jet nozzle and air tube, and said fins and said slots increasing in length correspondingly with the increase in width of said tunnel, the trailing edges of said fins being disposed in a plane curving downwardly and rearwardly and said tunnel having a bottom wall curving downwardly and rearwardly longitudinally of the tunnel and for approximately the rear half of its length in spaced relation with and in general conformance with the curvature of said plane.

OSCAR N. DAVIS.

REFERENCES CITED

The following references are of record in the file of this patent:

UNITED STATES PATENTS

| Number | Name | Date |
|---|---|---|
| 368,678 | McDougall | Aug. 23, 1887 |
| 1,069,694 | Hayot | Aug. 12, 1913 |
| 1,344,518 | Rees | June 22, 1920 |
| 1,369,672 | Koenig | Feb. 22, 1921 |
| 1,375,601 | Morize | Apr. 19, 1921 |
| 1,517,422 | Hall | Dec. 2, 1924 |
| 2,280,835 | Lysholm | Apr. 28, 1942 |
| 2,348,253 | Griswold | May 9, 1944 |
| 2,404,954 | Godsey | July 30, 1946 |
| 2,432,359 | Streid | Dec. 9, 1947 |
| 2,453,721 | Mercier | Nov. 16, 1948 |

FOREIGN PATENTS

| Number | Country | Date |
|---|---|---|
| 468,281 | Great Britain | June 28, 1937 |
| 504,539 | Great Britain | Apr. 26, 1939 |
| 522,187 | Great Britain | June 11, 1940 |